(12) United States Patent
Takeuchi et al.

(10) Patent No.: US 11,158,459 B2
(45) Date of Patent: Oct. 26, 2021

(54) CERAMIC ELECTRONIC COMPONENT AND METHOD FOR MANUFACTURING CERAMIC ELECTRONIC COMPONENT

(71) Applicant: Murata Manufacturing Co., Ltd., Nagaokakyo (JP)

(72) Inventors: Syunsuke Takeuchi, Nagaokakyo (JP); Yusuke Arakawa, Nagaokakyo (JP); Masaki Tsutsumi, Nagaokakyo (JP)

(73) Assignee: MURATA MANUFACTURING COMPANY, LTD., Kyoto (JP)

( * ) Notice: Subject to any disclaimer, the term of this patent is extended or adjusted under 35 U.S.C. 154(b) by 7 days.

(21) Appl. No.: 16/678,074

(22) Filed: Nov. 8, 2019

(65) Prior Publication Data
US 2020/0152387 A1 May 14, 2020

(30) Foreign Application Priority Data
Nov. 8, 2018 (JP) .............................. JP2018-210719

(51) Int. Cl.
*H01G 4/232* (2006.01)
*H01G 4/248* (2006.01)
*H01G 4/30* (2006.01)
*H01G 4/12* (2006.01)

(52) U.S. Cl.
CPC ........... *H01G 4/2325* (2013.01); *H01G 4/248* (2013.01); *H01G 4/30* (2013.01); *H01G 4/1227* (2013.01); *H01G 4/1236* (2013.01)

(58) Field of Classification Search
CPC ........ H01G 4/2325; H01G 4/248; H01G 4/30; H01G 4/1227; H01G 4/1236
See application file for complete search history.

(56) References Cited

U.S. PATENT DOCUMENTS

| 8,228,663 | B2 * | 7/2012 | Takeuchi | H01G 4/2325 361/306.3 |
| 8,508,912 | B2 * | 8/2013 | Yamamoto | H01G 4/35 361/306.3 |
| 2004/0042155 | A1 * | 3/2004 | Ritter | H01G 4/30 361/309 |
| 2008/0080122 | A1 * | 4/2008 | Togashi | H01G 4/232 361/303 |

(Continued)

FOREIGN PATENT DOCUMENTS

| JP | 02-277205 A | 11/1990 |
| JP | 2003-243249 A | 8/2003 |
| JP | 2009-137822 A | 6/2009 |

*Primary Examiner* — Dion Ferguson
(74) *Attorney, Agent, or Firm* — Keating & Bennett, LLP

(57) ABSTRACT

A ceramic electronic component includes a ceramic body having first and second end surfaces facing each other, first and second side surfaces facing each other, and first and second principal surfaces facing each other, and also includes outer electrodes each of which is provided on at least one portion of a corresponding one of the first and second end surfaces of the ceramic body. Each of the outer electrodes includes an underlying electrode layer provided on at least one portion of a corresponding one of the first and second end surfaces of the ceramic body and also includes a plating layer provided on a corresponding one of the underlying electrode layers and on a corresponding one of regions different from the underlying electrode layers.

20 Claims, 10 Drawing Sheets

(56) References Cited

U.S. PATENT DOCUMENTS

| | | | |
|---|---|---|---|
| 2008/0128860 A1* | 6/2008 | Sawada | H01G 4/30 257/536 |
| 2008/0239617 A1* | 10/2008 | Motoki | H01G 4/30 361/301.4 |
| 2013/0208401 A1* | 8/2013 | Shirakawa | H01G 4/008 361/305 |
| 2015/0022945 A1* | 1/2015 | Park | H01G 4/30 361/301.4 |
| 2015/0083475 A1* | 3/2015 | Kim | H01G 2/06 174/260 |
| 2015/0279567 A1* | 10/2015 | Nishisaka | H01G 4/1227 361/301.4 |
| 2018/0082785 A1* | 3/2018 | Asano | H01G 4/14 |
| 2018/0114644 A1* | 4/2018 | Sugita | H01G 4/12 |

* cited by examiner

CERAMIC ELECTRONIC COMPONENT AND METHOD FOR MANUFACTURING CERAMIC ELECTRONIC COMPONENT

CROSS REFERENCE TO RELATED APPLICATIONS

This application claims the benefit of priority to Japanese Patent Application No. 2018-210719 filed on Nov. 8, 2018. The entire contents of this application are hereby incorporated herein by reference.

BACKGROUND OF THE INVENTION

1. Field of the Invention

The present invention relates to a ceramic electronic component and a method for manufacturing the same.

2. Description of the Related Art

The following capacitor has been known as one of ceramic electronic components. A multilayer ceramic capacitor includes a ceramic body including dielectric layers and inner electrodes alternately laminated and a pair of outer electrodes provided on a pair of end surfaces of the ceramic body that face each other. The ceramic body has a first end surface, a second end surface facing the first end surface in a length direction, a first side surface, a second side surface facing the first side surface in a width direction perpendicular to the length direction, a first principal surface, and a second principal surface facing the first principal surface in a thickness direction perpendicular to the length direction and the width direction.

A multilayer ceramic capacitor including outer electrodes plated for the purpose of facilitating solder mounting is also known.

As one of such multilayer ceramic capacitors, Japanese Unexamined Patent Application Publication No. 2003-243249 (hereinafter referred to as the patent document) describes a multilayer ceramic capacitor including an underlying electrode layer made of Cu or the like, a Ni plating layer formed on the underlying electrode layer, and a Sn plating layer formed on the Ni plating layer.

However, in the multilayer ceramic capacitor described in the patent document, the underlying electrode layer is provided over a region where an outer electrode is provided and therefore the thickness of the outer electrode is large overall. Thus, the multilayer ceramic capacitor has an increased size.

SUMMARY OF THE INVENTION

Preferred embodiments of the present invention provide ceramic electronic components that are each able to be downsized and methods for manufacturing the ceramic electronic components. According to a preferred embodiment of the present invention, a ceramic electronic component includes a ceramic body including a first end surface, a second end surface facing the first end surface in a length direction, a first side surface, a second side surface facing the first side surface in a width direction perpendicular or substantially perpendicular to the length direction, a first principal surface, and a second principal surface facing the first principal surface in a thickness direction perpendicular or substantially perpendicular to the length direction and the width direction and also includes outer electrodes each of which is provided on at least one portion of a corresponding one of the first end surface and second end surface of the ceramic body. Each of the outer electrodes includes an underlying electrode layer provided on at least one portion of a corresponding one of the first end surface and second end surface of the ceramic body and a plating layer provided on a corresponding one of the underlying electrode layers and on a corresponding one of regions different from the underlying electrode layers.

Each of the outer electrodes may further include a metal-containing layer provided on a portion of at least one of the first principal surface, second principal surface, first side surface, and second side surface of the ceramic body. Each of the plating layers may be provided on at least a corresponding one of the underlying electrode layers and a corresponding one of the metal-containing layers.

The metal-containing layers may include at least one selected from the group consisting of Pd, Ti, Cu, Ni, Ni—Cr, and Ni—Cu.

Each of the plating layers may cover a corresponding one of the underlying electrode layers and a portion of at least one of the first principal surface, second principal surface, first side surface, and second side surface of the ceramic body.

Portions of at least one of the first principal surface, second principal surface, first side surface, and second side surface of the ceramic body may be semiconducting regions. Each of the plating layers may cover a corresponding one of the underlying electrode layers and a corresponding one of the semiconducting regions.

Each of the underlying electrode layers may extend from a corresponding one of the first end surface and second end surface of the ceramic body to at least one of the first principal surface, second principal surface, first side surface, and second side surface of the ceramic body. Each of the plating layers may cover at least a corresponding one of the underlying electrode layers. The ratio of the extension length of the underlying electrode layers in the length direction to the extension length of the plating layers in the length direction may be about 0.5 or less on the basis of the first end surface or second end surface of the ceramic body.

Each of the plating layers may include a Ni plating layer, a Sn plating layer provided on the Ni plating layer, and an auxiliary plating layer provided under the Ni plating layer.

The ceramic electronic component may be a multilayer ceramic capacitor.

According to a preferred embodiment of the present invention, a method for manufacturing a ceramic electronic component includes a step of preparing a ceramic body including a first end surface, a second end surface facing the first end surface in a length direction, a first side surface, a second side surface facing the first side surface in a width direction perpendicular or substantially perpendicular to the length direction, a first principal surface, and a second principal surface facing the first principal surface in a thickness direction perpendicular or substantially perpendicular to the length direction and the width direction; a step of forming an underlying electrode layer on at least one portion of each of the first end surface and second end surface of the ceramic body; and a step of forming each of plating layers on a corresponding one of the underlying electrode layers and a corresponding one of regions different from the underlying electrode layers.

In the step of forming the plating layers, each of metal-containing layers including at least one selected from the group consisting of Pd, Ti, Cu, Ni, Ni—Cr, and Ni—Cu may be formed on a portion of at least one of the first principal surface, second principal surface, first side surface, and second side surface of the ceramic body and each of the plating layers may be formed on at least a corresponding one of the underlying electrode layers and a corresponding one of the metal-containing layers.

In the step of forming the plating layers, regions of at least one of the first principal surface, second principal surface, first side surface, and second side surface of the ceramic body may be made semiconducting and each of the plating layers may be formed on a corresponding one of the underlying electrode layers and a corresponding one of the semiconducting regions.

In accordance with ceramic electronic components according to preferred embodiment of the present invention, a portion of a region where an outer electrode is disposed is provided with an underlying electrode layer and therefore the thickness of the outer electrode can be partially reduced as compared to a configuration in which the underlying electrode layer is disposed on the entire region of the outer electrode. Accordingly, the multilayer ceramic capacitors are able to be downsized.

In accordance with methods for manufacturing ceramic electronic components according to preferred embodiments of the present invention, the ceramic electronic components can be manufactured such that a portion of a region where an outer electrode is disposed is provided with an underlying electrode layer, the outer electrode has a partially reduced thickness, and the ceramic electronic components are compact.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described in detail below with reference to the drawings.

A multilayer ceramic capacitor is described below as an example of a ceramic electronic component according to preferred embodiments of the present invention. The ceramic electronic component is not limited to the multilayer ceramic capacitor.

First Preferred Embodiment

Figure 1:
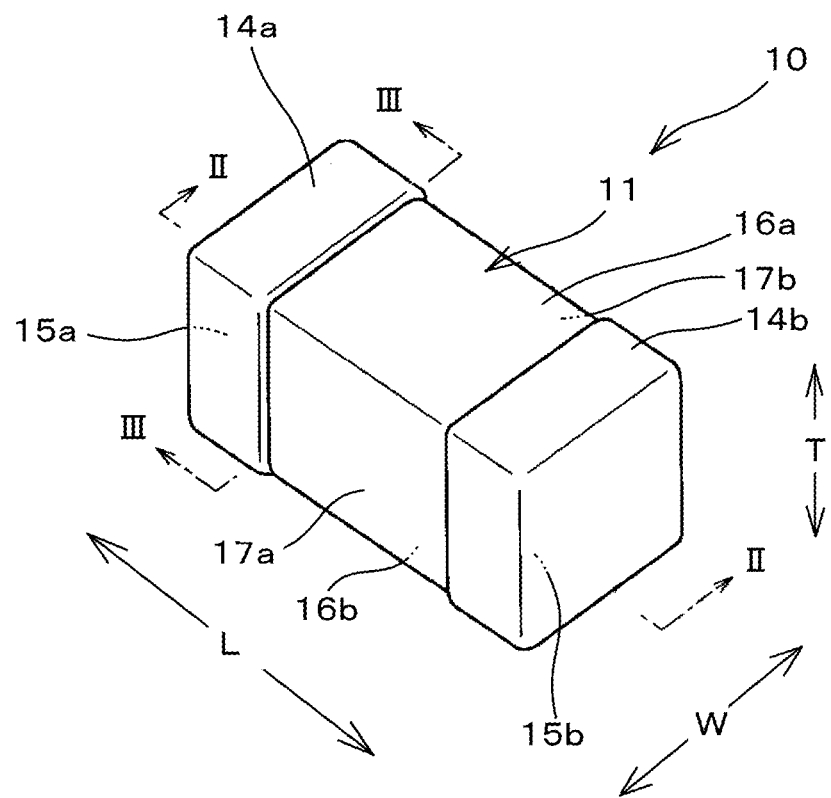
FIG. 1 is a perspective view of a multilayer ceramic capacitor according to a first preferred embodiment of the present invention.
Figure 2:
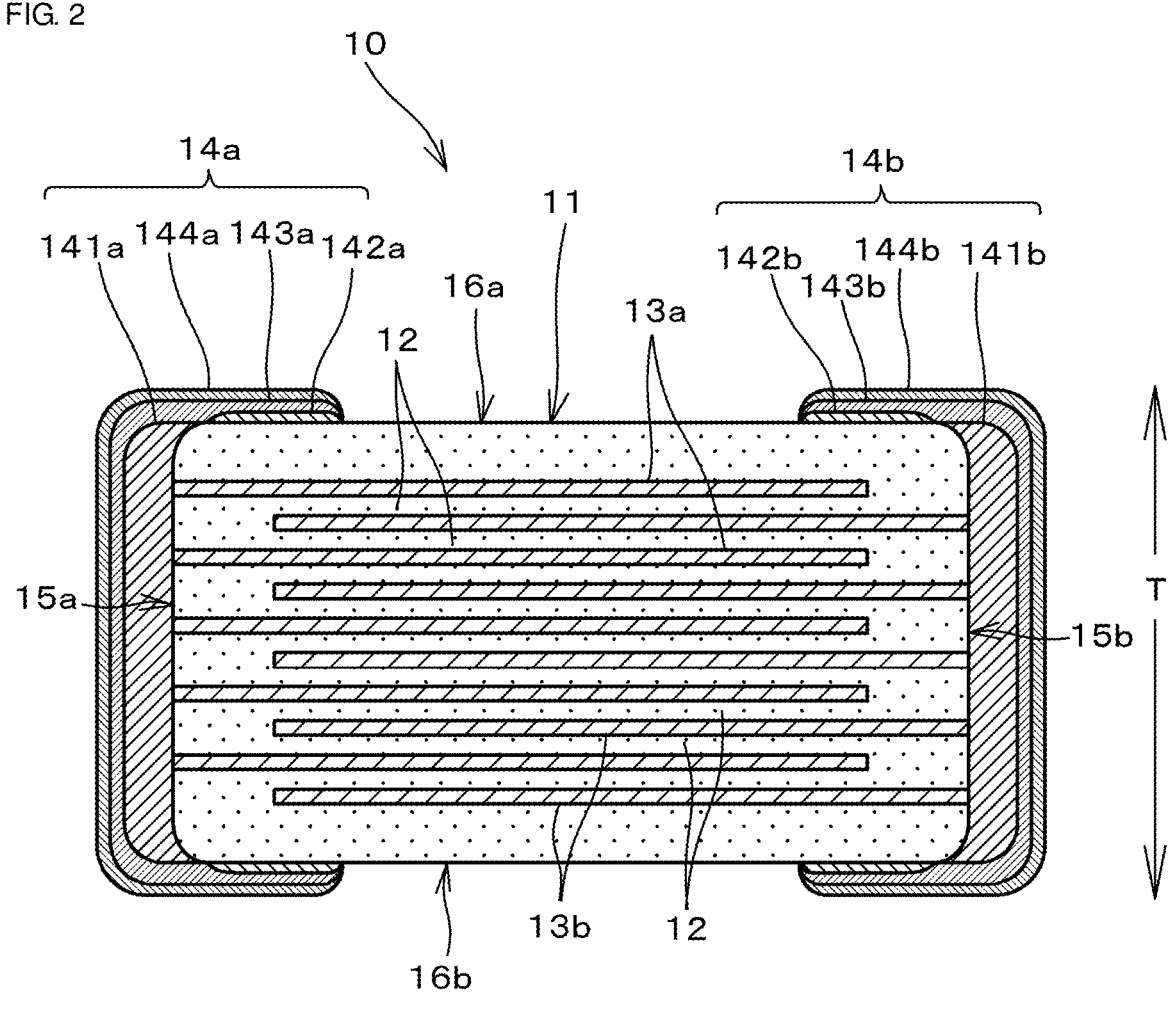
FIG. 2 is a sectional view of the multilayer ceramic capacitor taken along the line II-II of FIG. 1.
Figure 3:
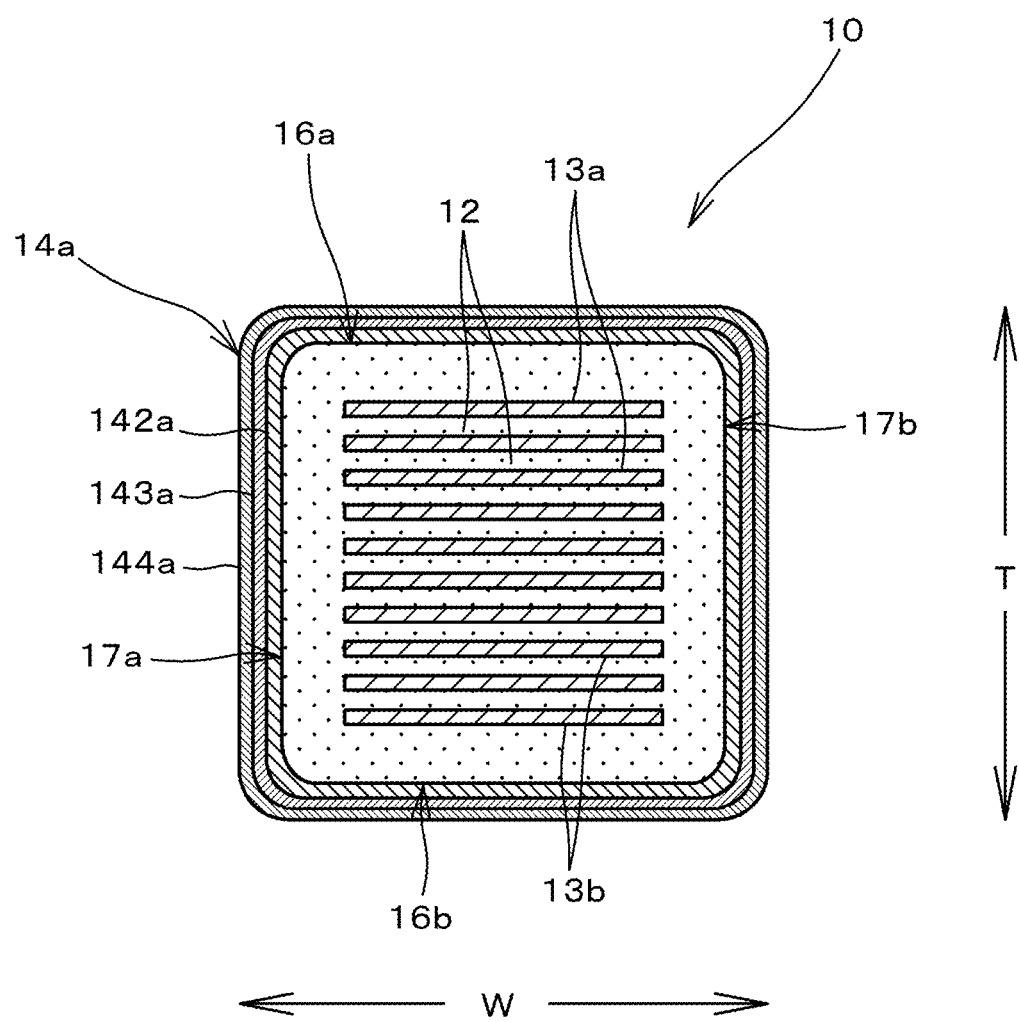
FIG. 3 is a sectional view of the multilayer ceramic capacitor taken along the line of FIG. 1.

FIG. 1 is a perspective view of a multilayer ceramic capacitor 10 according to a first preferred embodiment of the present invention. FIG. 2 is a sectional view of the multilayer ceramic capacitor 10 taken along the line II-II of FIG. 1. FIG. 3 is a sectional view of the multilayer ceramic capacitor 10 taken along the line III-III of FIG. 1.

As shown in FIGS. 1 to 3, the multilayer ceramic capacitor 10 has a cuboid or substantially cuboid shape overall and includes a ceramic body 11, a first outer electrode 14a, and a second outer electrode 14b. As shown in FIG. 1, the first outer electrode 14a and the second outer electrode 14b face each other.

Herein, a direction in which the first outer electrode 14a and the second outer electrode 14b face each other is defined as a length direction L of the multilayer ceramic capacitor 10, a direction perpendicular or substantially perpendicular to the length direction L is defined as a width direction W, and a direction perpendicular or substantially perpendicular to both the length direction L and the width direction W is defined as a thickness direction T.

The ceramic body 11 includes a first end surface 15a, a second end surface 15b facing the first end surface 15a in the length direction L, a first principal surface 16a, a second principal surface 16b facing the first principal surface 16a in the thickness direction T, a first side surface 17a, and a second side surface 17b facing the first side surface 17a in the width direction W.

The ceramic body 11 preferably includes rounded corner sections and rounded edge sections. Herein, each of the corner sections is a section where three surfaces of the ceramic body 11 intersect and each of the edge sections is a section where two surfaces of the ceramic body 11 intersect.

As shown in FIGS. 2 and 3, the ceramic body 11 includes a plurality of dielectric layers 12, a plurality of first inner electrodes 13a, and a plurality of second inner electrodes 13b. In particular, the ceramic body 11 has a structure in which the first inner electrodes 13a and the second inner electrodes 13b are alternately laminated in the thickness direction T with the dielectric layers 12 therebetween.

Incidentally, FIGS. 2 and 3 show an example in which five of the first inner electrodes 13a and the five of the second inner electrodes 13b are provided. The number of the first inner electrodes 13a and the number of the second inner electrodes 13b are not limited to five.

The dielectric layers 12 preferably include, for example, a dielectric ceramic mainly including barium titanate (BaTiO$_3$), calcium zirconate (CaZrO$_3$), or the like.

The first inner electrodes 13a are extended to the first end surface 15a of the ceramic body 11. The second inner electrodes 13b are extended to the second end surface 15b of the ceramic body 11.

The ceramic body 11 may include inner electrodes not exposed to a surface in addition to the first inner electrodes 13a and the second inner electrodes 13b.

Each of the first inner electrodes 13a includes a facing electrode section facing a corresponding one of the second inner electrodes 13b and an extended electrode section extended from the facing electrode section to the first end surface 15a of the ceramic body 11. Each of the second inner electrodes 13b includes a facing electrode section facing a corresponding one of the first inner electrodes 13a and an extended electrode section extended from this facing electrode section to the second end surface 15b of the ceramic body 11.

The facing electrode sections of the first inner electrodes 13a face the facing electrode sections of the second inner electrodes 13b with the dielectric layers 12 therebetween, thus producing capacitance. This allows the first inner electrodes 13a, the second inner electrodes 13b, and the dielectric layers 12 to define and function as a capacitor.

The first inner electrodes 13a and the second inner electrodes 13b preferably include, for example, metal such as Cu, Ni, Ag, Pd, Ti, Cr, or Au, an alloy mainly including the metal, or the like. The first inner electrodes 13a and the second inner electrodes 13b may preferably include dielectric particles having the same or a similar composition as that of the dielectric ceramic included in the dielectric layers 12 as a common material.

The first outer electrode 14a is provided on at least one portion of the first end surface 15a of the ceramic body 11. In the first preferred embodiment, the first outer electrode 14a is provided over the first end surface 15a of the ceramic body 11 and extends from the first end surface 15a to the first principal surface 16a, the second principal surface 16b, the first side surface 17a, and the second side surface 17b. The first outer electrode 14a is electrically connected to the first inner electrodes 13a.

The second outer electrode 14b is provided on at least one portion of the second end surface 15b of the ceramic body 11. In the first preferred embodiment, the second outer electrode 14b is provided over the second end surface 15b of the ceramic body 11 and extends from the second end surface 15b to the first principal surface 16a, the second principal surface 16b, the first side surface 17a, and the second side surface 17b. The second outer electrode 14b is electrically connected to the second inner electrodes 13b.

Each of the first outer electrode 14a and the second outer electrode 14b includes an underlying electrode layer 141, a metal-containing layer 142, a first plating layer 143, and a second plating layer 144. The first plating layer 143 and the second plating layer 144 define a "plating layer" according to the first preferred embodiment the present invention. Herein, the underlying electrode layer 141, the metal-containing layer 142, the first plating layer 143, and the second plating layer 144 of the first outer electrode 14a are described with the symbol "a" added thereto and the underlying electrode layer 141, the metal-containing layer 142, the first plating layer 143, and the second plating layer 144 of the second outer electrode 14b are described with the symbol "b" added thereto.

The first outer electrode 14a includes the underlying electrode layer 141a, the metal-containing layer 142a, the first plating layer 143a, and the second plating layer 144a. The second outer electrode 14b includes the underlying electrode layer 141b, the metal-containing layer 142b, the first plating layer 143b, and the second plating layer 144b.

The underlying electrode layer 141a is provided on at least one portion of the first end surface 15a of the ceramic body 11. In the first preferred embodiment, the underlying electrode layer 141a is provided over the first end surface 15a of the ceramic body 11.

The underlying electrode layer 141b is provided on at least one portion of the second end surface 15b of the ceramic body 11. In the first preferred embodiment, the underlying electrode layer 141b is provided over the second end surface 15b of the ceramic body 11.

The underlying electrode layers 141a and 141b preferably include Cu and glass, for example. Each of the underlying electrode layers 141a and 141b may be a single layer or a multilayer. Metal included in the underlying electrode layers 141a and 141b is not limited to Cu and may be, for example, metal such as Ni, Ag, Pd, or Au, an alloy of Ag and Pd, or the like. The underlying electrode layers 141a and 141b preferably have a thickness of, for example, about 10 μm.

The metal-containing layer 142a is provided above a region which is located on surfaces of the ceramic body 11 and on which the first plating layer 143a is provided. In the first preferred embodiment, as shown in FIGS. 2 and 3, the metal-containing layer 142a is provided on a portion of each of the first principal surface 16a, the second principal surface 16b, the first side surface 17a, and the second side surface 17b.

Similarly, the metal-containing layer 142b is provided above a region which is located on surfaces of the ceramic body 11 and on which the first plating layer 143b is provided. In the first preferred embodiment, as shown in FIGS. 2 and 3, the metal-containing layer 142b is provided on a portion of each of the first principal surface 16a, the second principal surface 16b, the first side surface 17a, and the second side surface 17b.

Figure 4:
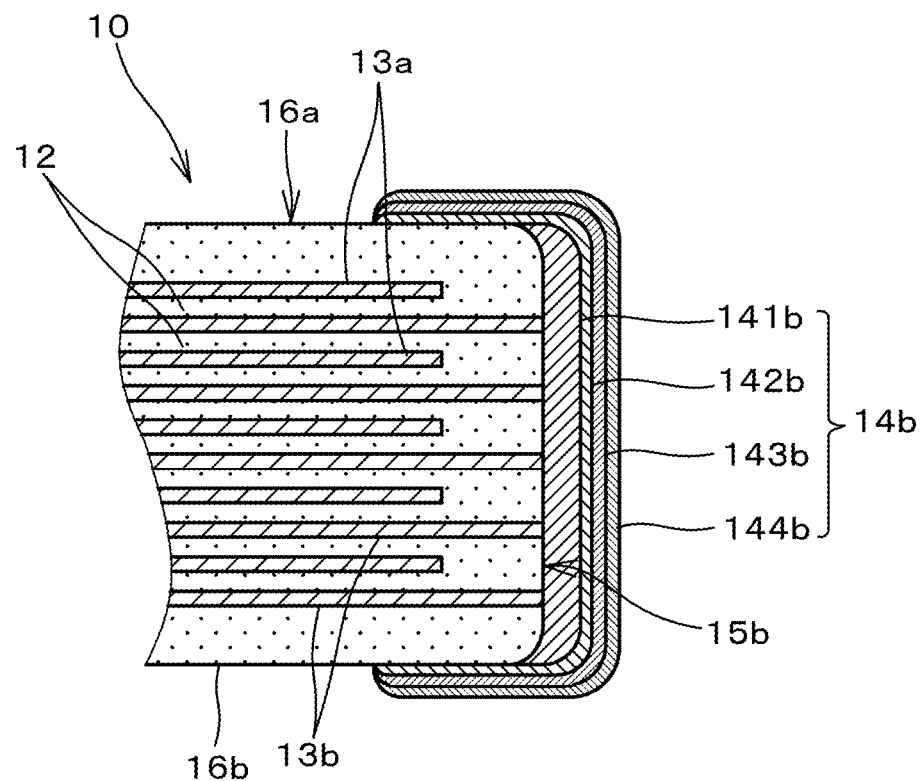
FIG. 4 is an enlarged sectional view of a second outer electrode in which a metal-containing layer covers an underlying electrode layer.
Figure 5:
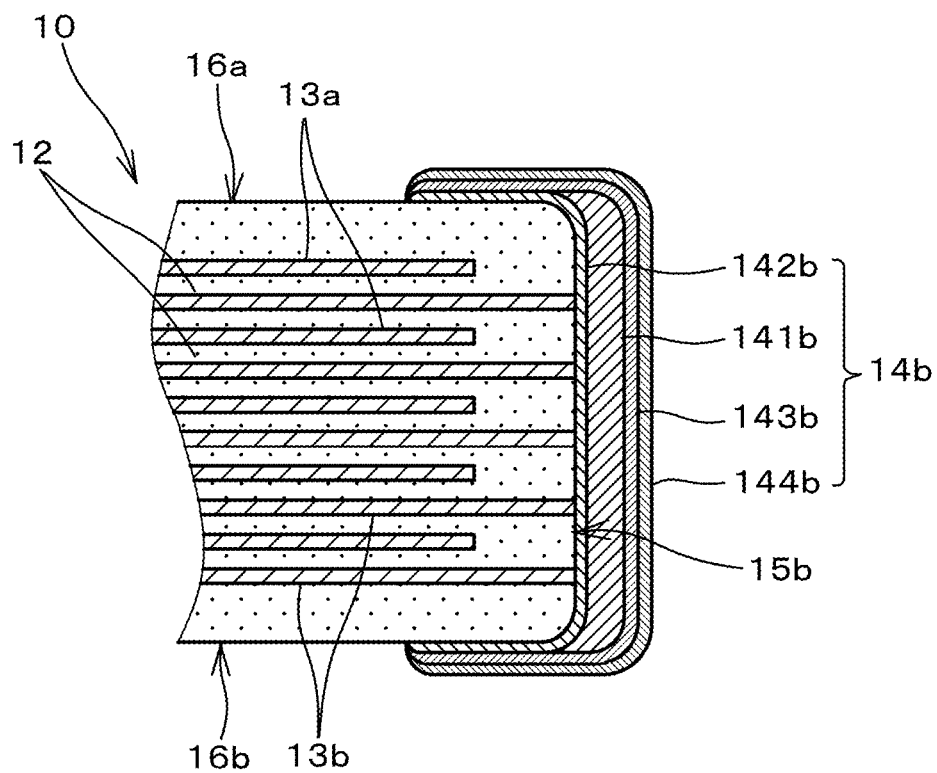
FIG. 5 is an enlarged sectional view of a second outer electrode in which a metal-containing layer is inside an underlying electrode layer.

As shown in FIG. 4, the metal-containing layer 142b may cover the underlying electrode layer 141b. Alternatively, as shown in FIG. 5, the metal-containing layer 142b may be provided inside the underlying electrode layer 141b. Similarly, the metal-containing layer 142a may cover the underlying electrode layer 141a or may be provided inside the underlying electrode layer 141a. This is not shown.

The metal-containing layers 142a and 142b preferably include, for example, metal such as Pd, Ti, Cu, or Ni or an alloy such as Ni—Cr or Ni—Cu. The metal-containing layers 142a and 142b have a smaller thickness than the underlying electrode layers 141a and 141b and preferably have a thickness of, for example, about 0.5 μm.

Even when the underlying electrode layers 141a and 141b and the metal-containing layers 142a and 142b include the same or substantially the same metal, the underlying electrode layers 141a and 141b can be distinguished from the metal-containing layers 142a and 142b because the size of metal particles included in the underlying electrode layers 141a and 141b is different from the size of metal particles included in the metal-containing layers 142a and 142b. That is, when the underlying electrode layers 141a and 141b and the metal-containing layers 142a and 142b include the same or substantially the same metal, the size of the metal particles included in the underlying electrode layers 141a and 141b is larger than the size of the metal particles included in the metal-containing layers 142a and 142b.

The first plating layer 143a is provided on the underlying electrode layer 141a and a region different from the underlying electrode layer 141a. In the first preferred embodiment, the first plating layer 143a is provided on the underlying electrode layer 141a and the metal-containing layer 142a. That is, the first plating layer 143a extends from the first end surface 15a to the first principal surface 16a, the second principal surface 16b, the first side surface 17a, and the second side surface 17b.

The first plating layer 143b is provided on the underlying electrode layer 141b and a region different from the underlying electrode layer 141b. In the first preferred embodiment, the first plating layer 143b is provided on the underlying electrode layer 141b and the metal-containing layer 142b. That is, the first plating layer 143b extends from the second end surface 15b to the first principal surface 16a, the second principal surface 16b, the first side surface 17a, and the second side surface 17b.

The first plating layers 143a and 143b are preferably, for example, Ni plating layers including Ni. However, the first plating layers 143a and 143b are not limited to the Ni plating layers. The first plating layers 143a and 143b preferably have a thickness of, for example, about 3 µm.

The second plating layer 144a is provided on the first plating layer 143a. The second plating layer 144b is provided on the first plating layer 143b.

The second plating layers 144a and 144b are preferably, for example, Sn plating layers including Sn. However, the second plating layers 144a and 144b are not limited to the Sn plating layers. The second plating layers 144a and 144b preferably have a thickness of, for example, about 3 µm.

Since the second plating layers 144a and 144b are the Sn plating layers, the solder wettability thereof is high and the mountability of the multilayer ceramic capacitor 10 is high. Since the second plating layers 144a and 144b are the Ni plating layers, the solder corrosion of the underlying electrode layers 141a and 141b during solder mounting can be significantly reduced or prevented.

In the above description, the plating layer has been described as that including two layers: the first plating layer 143 and the second plating layer 144. The plating layer may be a single layer or may have a multilayer structure including three or more layers. Metal included in the plating layer may be, for example, at least one selected from the group consisting of Cu, Ni, Sn, Au, Ag, and Pd.

According to the multilayer ceramic capacitor 10, plating layers of each of the first outer electrode 14a and the second outer electrode 14b are provided on the underlying electrode layer and the region different from the underlying electrode layer. Thus, the first outer electrode 14a and the second outer electrode 14b may have a reduced thickness on the principal surfaces and the side surfaces. That is, the underlying electrode layer is provided on a portion of a region where one of the first outer electrode 14a and the second outer electrode 14b is provided. Thus, the thickness of the first outer electrode 14a and the second outer electrode 14b can be partially reduced as compared to a configuration in which the underlying electrode layer is provided on the entire region of each of the first outer electrode 14a and the second outer electrode 14b. Accordingly, the multilayer ceramic capacitor 10 is able to be downsized.

In particular, in the multilayer ceramic capacitor 10, each of the underlying electrode layers 141 is provided only on a corresponding one of the first end surface 15a and second end surface 15b of the ceramic body 11. That is, none of the underlying electrode layers 141 is provided on the first principal surface 16a, second principal surface 16b, first side surface 17a, or second side surface 17b of the ceramic body 11. Therefore, the multilayer ceramic capacitor 10 can be further downsized.

Since none of the underlying electrode layers 141 is provided on the first principal surface 16a, the second principal surface 16b, the first side surface 17a, or the second side surface 17b, no tensile stress is caused when the underlying electrode layers 141 are formed by, for example, baking. This prevents cracks from being caused from extension tip sections when the multilayer ceramic capacitor 10 is reflowed or a board having the multilayer ceramic capacitor 10 mounted thereon is bent in a case where the underlying electrode layers 141 extend to the first principal surface 16a, the second principal surface 16b, the first side surface 17a, and the second side surface 17b.

Modification of First Preferred Embodiment

In the above-mentioned multilayer ceramic capacitor 10 according to the first preferred embodiment, the underlying electrode layer 141a is provided only on the first end surface 15a of the ceramic body 11. The underlying electrode layer 141a may extend from the first end surface 15a to the first principal surface 16a, the second principal surface 16b, the first side surface 17a, and the second side surface 17b. Similarly, the underlying electrode layer 141b may extend from the first end surface 15b to the first principal surface 16a, the second principal surface 16b, the first side surface 17a, and the second side surface 17b.

Figure 6:
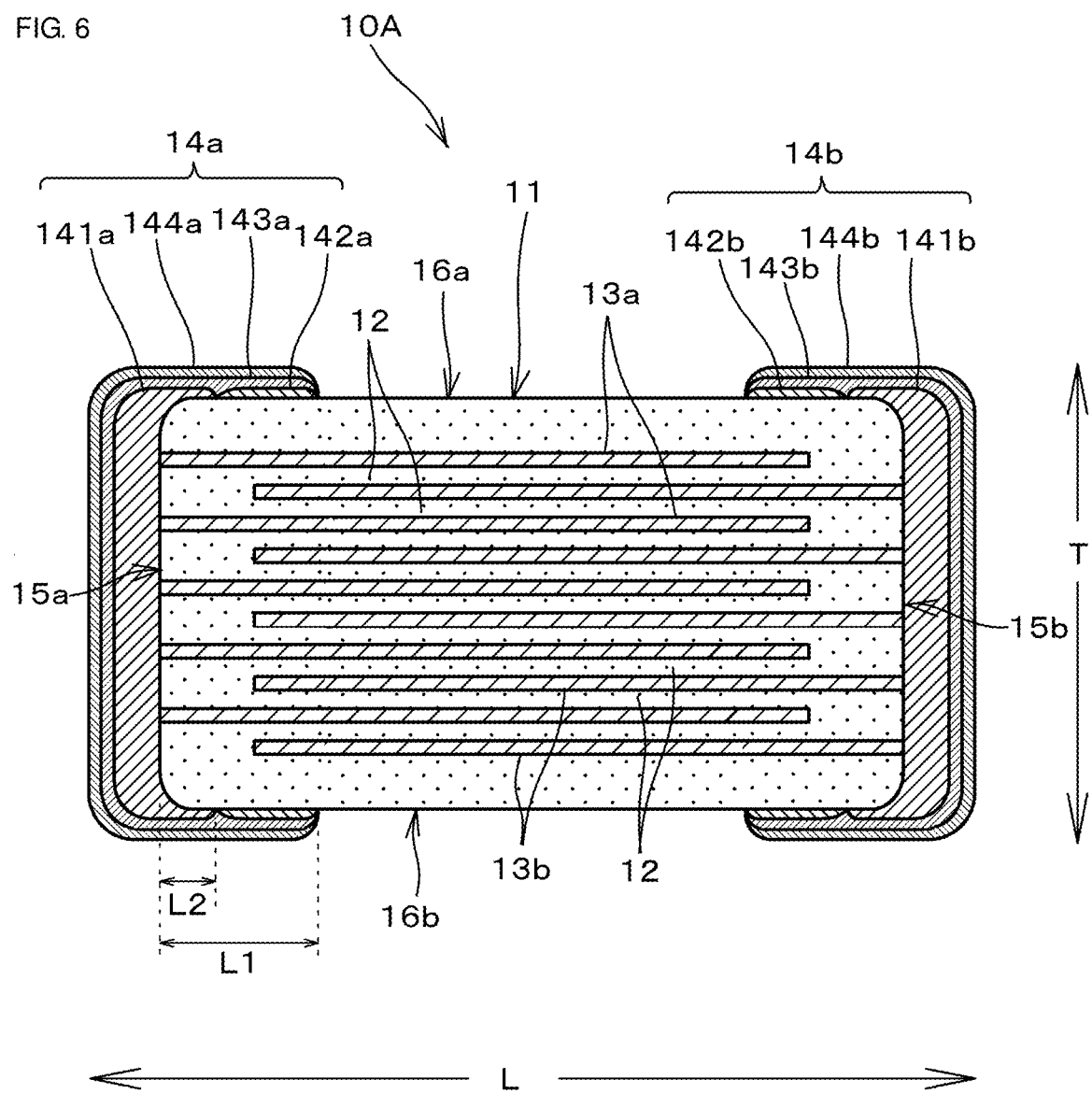
FIG. 6 is a sectional view of a multilayer ceramic capacitor according to a modification of the first preferred embodiment of the present invention.

FIG. 6 is a sectional view of a multilayer ceramic capacitor 10A according to a modification of the first preferred embodiment. An underlying electrode layer 141a extends from a first end surface 15a to a first principal surface 16a, a second principal surface 16b, a first side surface 17a, and a second side surface 17b. An underlying electrode layer 141b extends from a second end surface 15b to the first principal surface 16a, the second principal surface 16b, the first side surface 17a, and the second side surface 17b.

In this case, on the basis of the first end surface 15a or second end surface 15b of a ceramic body 11, the ratio of the extension length L2 of the underlying electrode layers 141a and 141b in the length direction L to the extension length L1 of a plating layer in the length direction L is preferably about 0.5 or less and more preferably about 0.25 or less, for example. The extension length L1 of the plating layer is preferably the largest one of the extension length of a first plating layer 143a, the extension length of a first plating layer 143b, the extension length of a second plating layer 144a, and the extension length of a second plating layer 144b.

The extension length L2 of the underlying electrode layers 141a and 141b is preferably about 100 µm or less and more preferably about 30 µm or less, for example.

Even in a configuration in which the underlying electrode layers 141a and 141b extend from the first end surface 15a and second end surface 15b, respectively, of the ceramic body 11 to the first principal surface 16a, the second principal surface 16b, the first side surface 17a, and the second side surface 17b as described above, adjusting the ratio of the extension length L2 of the underlying electrode layers 141a and 141b in the length direction L to the extension length L1 of a plating layer in the length direction L to about 0.5 or less on the basis of the first end surface 15a or the second end surface 15b enables regions where the underlying electrode layers 141a and 141b are provided to be reduced in size and the multilayer ceramic capacitor 10A to be downsized.

Method for Manufacturing Multilayer Ceramic Capacitor

A non-limiting example of a method for manufacturing the multilayer ceramic capacitor 10 is described below.

First, the ceramic body 11 is prepared. The ceramic body 11 includes the first end surface 15a; the first end surface 15a, which faces the first end surface 15a in the length direction L; the first side surface 17a; the second side surface 17b, which faces the first side surface 17a in the width direction W perpendicular or substantially perpendicular to the length direction L; the first principal surface 16a; and the second principal surface 16b, which faces the first principal surface 16a in the thickness direction T perpendicular or substantially perpendicular to the length direction L and the width direction W. In the ceramic body 11, the first inner electrodes 13a and the second inner electrodes 13b are alternately laminated with the dielectric layers 12 therebetween. The ceramic body 11 can be prepared by a known method.

Subsequently, the underlying electrode layers 141a and 141b are formed on at least one portion of the first end surface 15a and at least one portion of the second end surface 15b, respectively.

Before the underlying electrode layers 141a and 141b are formed, the ceramic body 11 is preferably subjected to barrel polishing or the like, and the first inner electrodes 13a are exposed to the first end surface 15a and the second inner electrodes 13b are exposed to the second end surface 15b. Exposing the first inner electrodes 13a and the second inner electrodes 13b to the first end surface 15a and the second end surface 15b, respectively, allows electrically connection with outer electrodes to be readily ensured.

The underlying electrode layers 141a and 141b can be formed by, for example, a dipping process and various printing processes, such as screen printing, in the form of thick electrodes. In this case, after the first end surface 15a and the second end surface 15b are coated with a conductive paste, the conductive paste is baked. The conductive paste preferably includes, for example, metal particles such as Cu particles, glass, and an organic solvent. In a case where the underlying electrode layers 141a and 141b are formed by the dipping process, the depth of the conductive paste is preferably small in order to significantly reduce or prevent the spread of the conductive paste during dipping.

The underlying electrode layers 141a and 141b can be formed by directly plating the first end surface 15a and second end surface 15b of the ceramic body 11. Plating is, for example, Cu plating. Plating is performed by electroplating.

Alternatively, the underlying electrode layers 141a and 141b can be formed by attaching conductive sheets to the first end surface 15a and second end surface 15b of the ceramic body 11. The conductive sheets preferably include, for example, Cu.

Subsequently, each of the metal-containing layers 142a and 142b is formed on a portion of at least one of the first end surface 15a, second end surface 15b, first principal surface 16a, and second principal surface 16b of the ceramic body 11. The metal-containing layers 142a and 142b preferably include, for example, at least one selected from the group consisting of Pd, Ti, Cu, Ni, Ni—Cr, and Ni—Cu. The metal-containing layers 142a and 142b can be formed by, for example, sputtering. The metal-containing layers 142a and 142b may be formed in such a manner that the ceramic body 11 is immersed in a metal-containing liquid including metal such as Pd. In a case where the metal-containing layers 142a and 142b are formed by sputtering or immersing the ceramic body 11 in the metal-containing liquid as described above, masking or the like is preferably performed for the purpose of forming the metal-containing layers 142a and 142b on predetermined regions.

The metal-containing layers 142a and 142b may be formed in a dotted pattern without being continuously formed.

The metal-containing layers 142a and 142b may be formed using paste with low viscosity or paste with low solid content. Such paste may preferably include, for example, a conductive polymer, Sn colloid, Pd colloid, or carbon black. The coating of paste can be performed by, for example, a dipping process.

Subsequently, plating layers are formed on the underlying electrode layers 141a and 141b and regions different from the underlying electrode layers 141a and 141b. Herein, the plating layers are formed on at least the underlying electrode layers 141a and 141b and the metal-containing layers 142a and 142b.

Each plating layer may be a single layer or may have a multilayer structure including two or more layers. A method of forming the plating layers is not particularly limited. The plating layers may be formed by, electroplating or electroless plating, for example.

In a case where the plating layers include a two-layer structure, the first plating layer 143a is formed on the underlying electrode layer 141a and the metal-containing layer 142a, the first plating layer 143b is formed on the underlying electrode layer 141b and the metal-containing layer 142b, and the second plating layers 144a and 144b are formed on the first plating layers 143a and 143b, respectively. In this case, the second plating layers 144a and 144b may preferably be, for example, Ni plating layers and the first plating layers 143a and 143b may be, for example, Sn plating layers.

Second Preferred Embodiment

Figure 7:
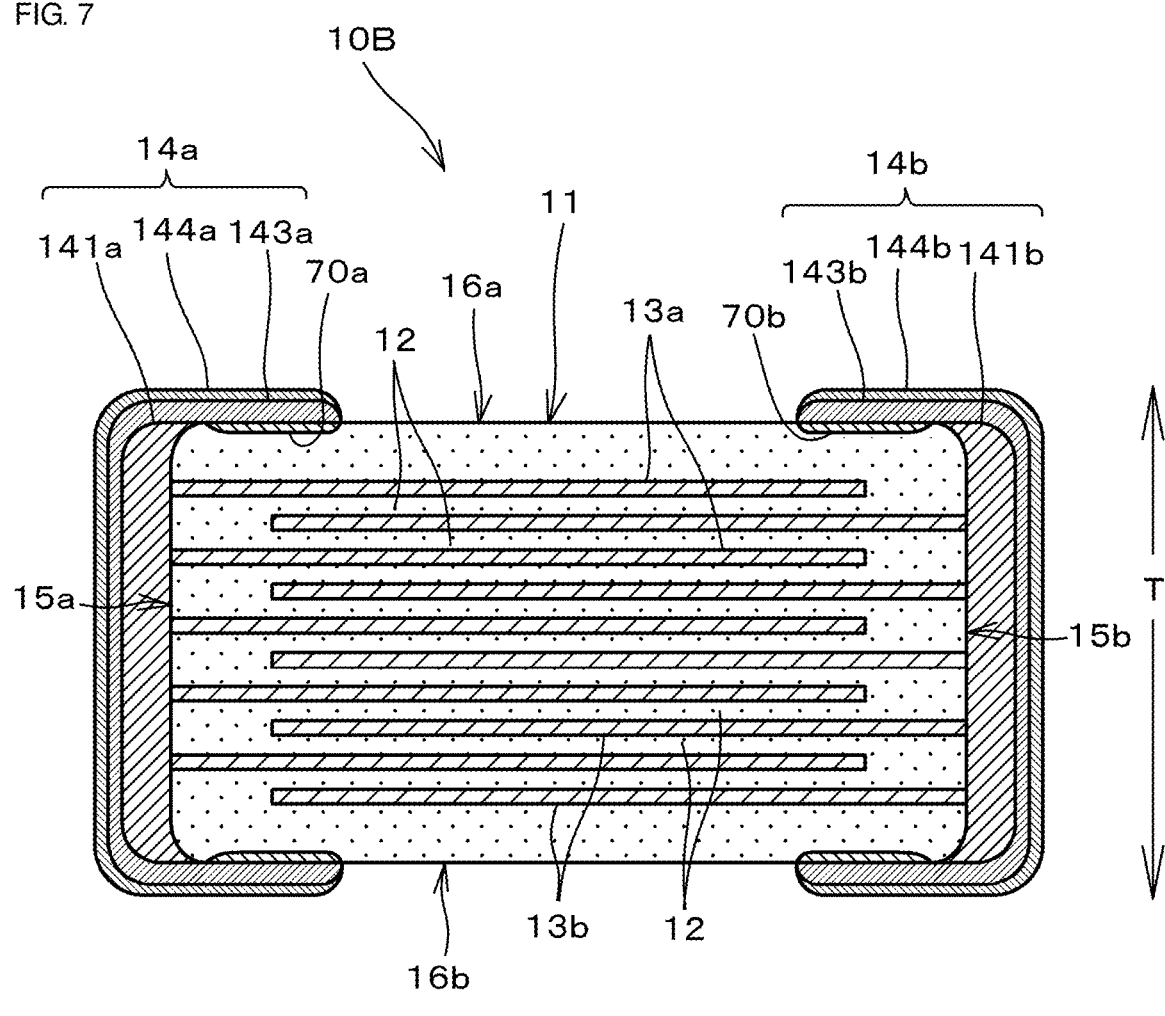
FIG. 7 is a perspective view of a multilayer ceramic capacitor according to a second preferred embodiment of the present invention.

FIG. 7 is a perspective view of a multilayer ceramic capacitor 10B according to a second preferred embodiment of the present invention. The multilayer ceramic capacitor 10B is different from the multilayer ceramic capacitor 10 according to the first preferred embodiment in that surfaces of a ceramic body 11 are provided with semiconducting regions 70a and 70b, instead of the metal-containing layers 142a and 142b. Portions of at least one of a first principal surface 16a, the second principal surface 16b, the first side surface 17a, and the second side surface 17b of the ceramic body 11 are provided with the semiconducting regions 70a and 70b.

At least one region which is not covered by an underlying electrode layer 141a on a surface of the ceramic body 11 and on which a first plating layer 143a is provided includes the semiconducting region 70a. In the second preferred embodiment, a portion of each of the first principal surface 16a, the second principal surface 16b, the first side surface 17a, and the second side surface 17b of the ceramic body 11 is provided with the semiconducting region 70a.

At least one region which is not covered by an underlying electrode layer 141b on a surface of the ceramic body 11 and on which a first plating layer 143b is provided includes the semiconducting region 70b. In the second preferred embodiment, a portion of each of the first principal surface 16a, the second principal surface 16b, the first side surface 17a, and the second side surface 17b of the ceramic body 11 is provided with the semiconducting region 70b.

The semiconducting regions 70a and 70b are formed in such a manner that, for example, predetermined surface regions of the ceramic body 11 are irradiated with a laser beam, and the surface regions of the ceramic body 11 are made to be semiconducting. The ceramic body 11 includes an insulating material.

In the second preferred embodiment, the first plating layer 143a is provided on the underlying electrode layer 141a and the semiconducting region 70a. The first plating layer 143b is provided on the underlying electrode layer 141b and the semiconducting region 70b.

A non-limiting example of a method for manufacturing the multilayer ceramic capacitor 10B is different in step from the method for manufacturing the multilayer ceramic capacitor 10 according to the first preferred embodiment described above. That is, the method for manufacturing the multilayer ceramic capacitor 10B includes a step of making regions of at least one of the first principal surface 16a, the second principal surface 16b, the first side surface 17a, and the second side surface 17b of the ceramic body 11 semiconducting and forming each of plating layers on a corresponding one of underlying electrode layers and a corresponding one of the regions made semiconducting instead of a step of forming a metal-containing layer and forming a plating layer on an underlying electrode layer and a metal-containing layer among steps of manufacturing the multilayer ceramic capacitor 10 according to the first preferred embodiment.

According to the multilayer ceramic capacitor 10B, the first plating layers 143a and 143b are provided on the semiconducting regions 70a and 70b, respectively, provided on surfaces of the ceramic body 11, a plating metal is more likely to be deposited as compared to a configuration in which none of the semiconducting regions 70a and 70b is provided. Thus, the first plating layers 143a and 143b are readily formed.

Modification of Second Preferred Embodiment

In the above multilayer ceramic capacitor 10B according to the second preferred embodiment, the underlying electrode layer 141a is provided only on the first end surface 15a of the ceramic body 11. The underlying electrode layer 141a may extend from the first end surface 15a to the first principal surface 16a, the second principal surface 16b, the first side surface 17a, and the second side surface 17b. Similarly, the underlying electrode layer 141b may extend from the second end surface 15b to the first principal surface 16a, the second principal surface 16b, the first side surface 17a, and the second side surface 17b.

Figure 8:
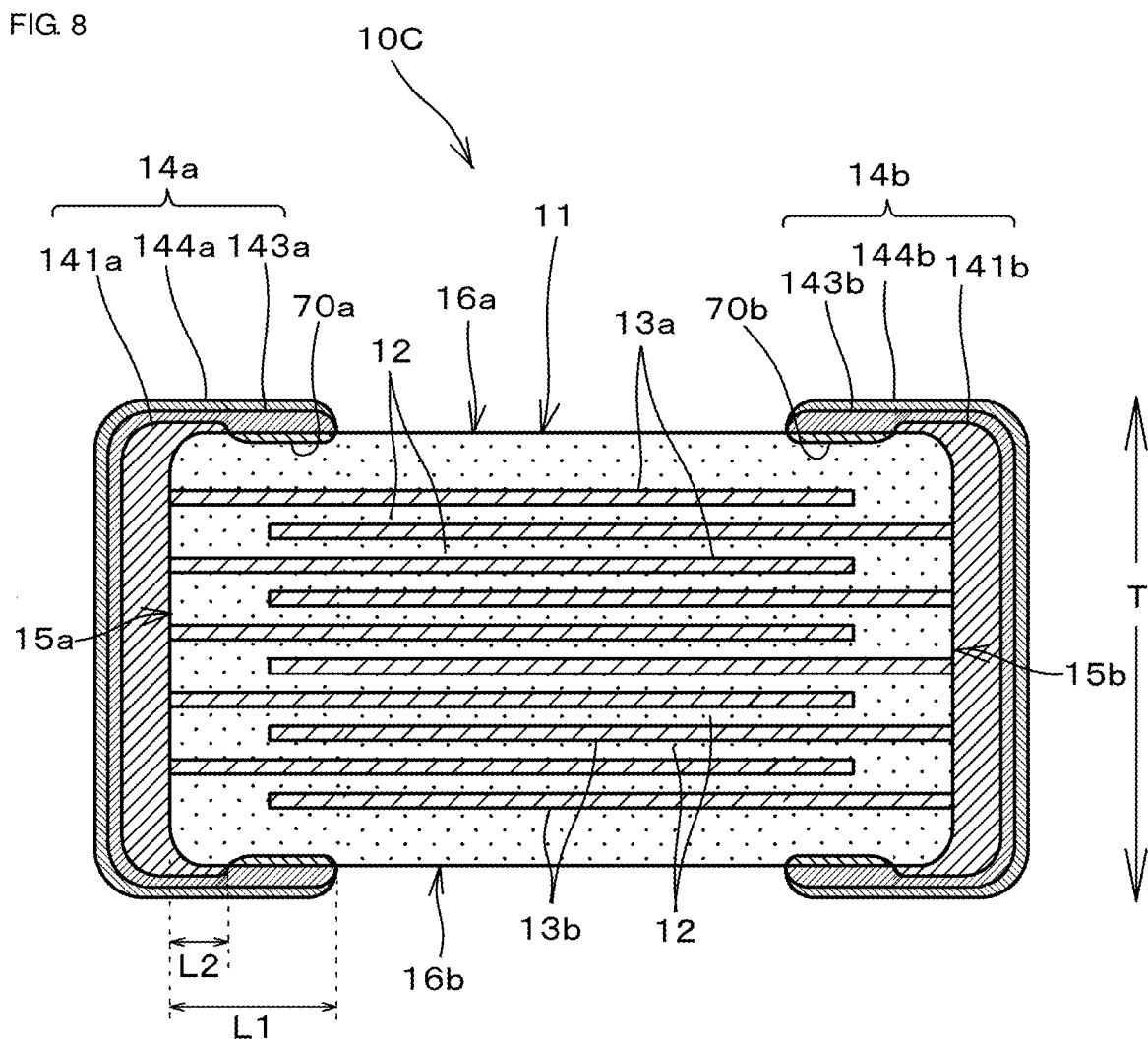
FIG. 8 is a sectional view of a multilayer ceramic capacitor according to a modification of the second preferred embodiment of the present invention.

FIG. 8 is a sectional view of a multilayer ceramic capacitor 10C according to a modification of the second preferred embodiment. As shown in FIG. 8, an underlying electrode layer 141a extends from a first end surface 15a to a first principal surface 16a, a second principal surface 16b, a first side surface 17a, and a second side surface 17b. An underlying electrode layer 141b extends from a second end surface 15b to the first principal surface 16a, the second principal surface 16b, the first side surface 17a, and the second side surface 17b.

In this case, on the basis of the first end surface 15a or second end surface 15b of a ceramic body 11, the ratio of the extension length L2 of the underlying electrode layers 141a and 141b in the length direction L to the extension length L1 of a plating layer in the length direction L is preferably about 0.5 or less and more preferably about 0.25 or less, for example. The extension length L2 of the underlying electrode layers 141a and 141b is preferably about 100 µm or less and more preferably about 30 µm or less, for example.

Third Preferred Embodiment

An auxiliary plating layer may be provided under each of first plating layers 143a and 143b for the purpose of facilitating the formation of a plating film forming each of the first plating layers 143a and 143b.

Figure 9:
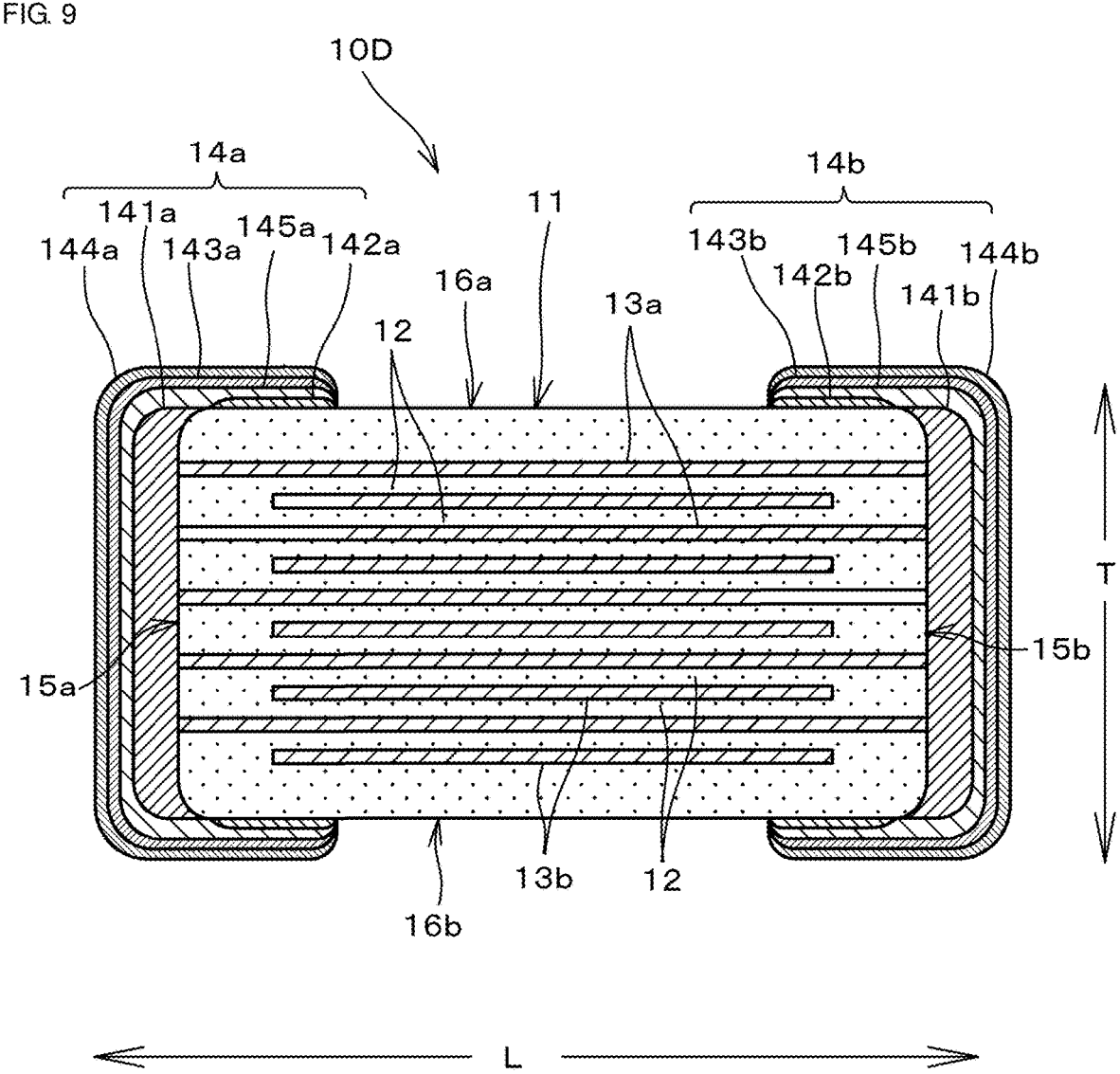
FIG. 9 is a sectional view of a multilayer ceramic capacitor according to a third preferred embodiment of the present invention, the multilayer ceramic capacitor is provided by adding auxiliary plating layers to the multilayer ceramic capacitor according to the first preferred embodiment of the present invention.

FIG. 9 is a sectional view of a multilayer ceramic capacitor 10D according to a third preferred embodiment of the present invention. The multilayer ceramic capacitor 10D is provided by adding auxiliary plating layers 145a and 145b to the multilayer ceramic capacitor 10, shown in FIG. 2, according to the first preferred embodiment. The auxiliary plating layer 145a covers an underlying electrode layer 141a and a metal-containing layer 142a. The auxiliary plating layer 145b covers an underlying electrode layer 141b and a metal-containing layer 142b.

The auxiliary plating layers 145a and 145b can be formed such that, for example, a ceramic body 11 provided with the underlying electrode layers 141a and 141b and the metal-containing layers 142a and 142b is immersed in a metal-containing liquid including metal such as Cu.

The first plating layer 143a is provided on the auxiliary plating layer 145a. The first plating layer 143b is provided on the auxiliary plating layer 145b. The first plating layers 143a and 143b are preferably, for example, Ni plating layers. Second plating layers 144a and 144b are provided on the first plating layers 143a and 143b, respectively, and are preferably, for example, Sn plating layers.

In the third preferred embodiment, the first plating layers 143a and 143b, the second plating layers 144a and 144b, and the auxiliary plating layers 145a and 145b define "plating layers" according to the present invention.

In the third preferred embodiment, since the auxiliary plating layers 145a and 145b are provided under the first plating layers 143a and 143b, respectively, the plating film forming each of the first plating layers 143a and 143b is readily formed.

A configuration can be obtained by adding auxiliary plating layers to the multilayer ceramic capacitor 10B, shown in FIG. 7, according to the second preferred embodiment.

Figure 10:
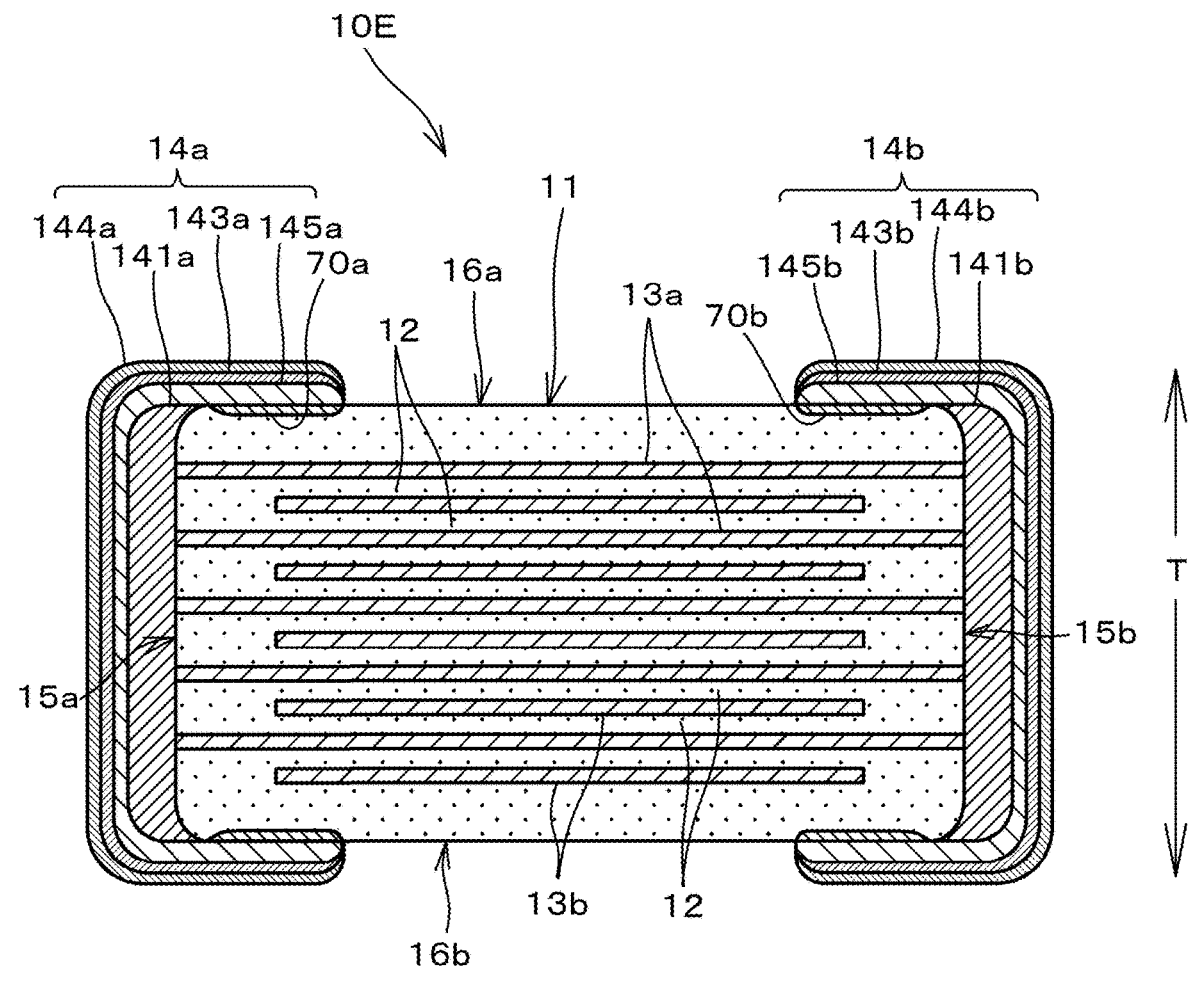
FIG. 10 is a sectional view of a multilayer ceramic capacitor provided by adding auxiliary plating layers to the multilayer ceramic capacitor according to the second preferred embodiment of the present invention.

FIG. 10 is a sectional view of a multilayer ceramic capacitor 10E provided by adding auxiliary plating layers 145a and 145b to the multilayer ceramic capacitor 10B, shown in FIG. 7, according to the second preferred embodiment. In this configuration, the auxiliary plating layer 145a is provided on the underlying electrode layer 141a and the semiconducting region 70a. The auxiliary plating layer 145b is provided on the underlying electrode layer 141b and the semiconducting region 70b.

The present invention is not limited to the above preferred embodiments. Various applications and modifications can be made within the scope of the present invention.

In each of the above-described preferred embodiments and the modifications thereof, for example, the first outer electrode 14a is provided over the first end surface 15a of the ceramic body 11 and on a portion of each of the first principal surface 16a, second principal surface 16b, first side surface 17a, and second side surface 17b thereof and the second outer electrode 14b is provided over the second end surface 15b of the ceramic body 11 and on a portion of each of the first principal surface 16a, second principal surface 16b, first side surface 17a, and second side surface 17b thereof.

However, the first outer electrode 14a may be provided on at least one portion of the first end surface 15a of the ceramic body 11 and the second outer electrode 14b may be provided on at least one portion of the second end surface 15b of the ceramic body 11.

Figure 11:
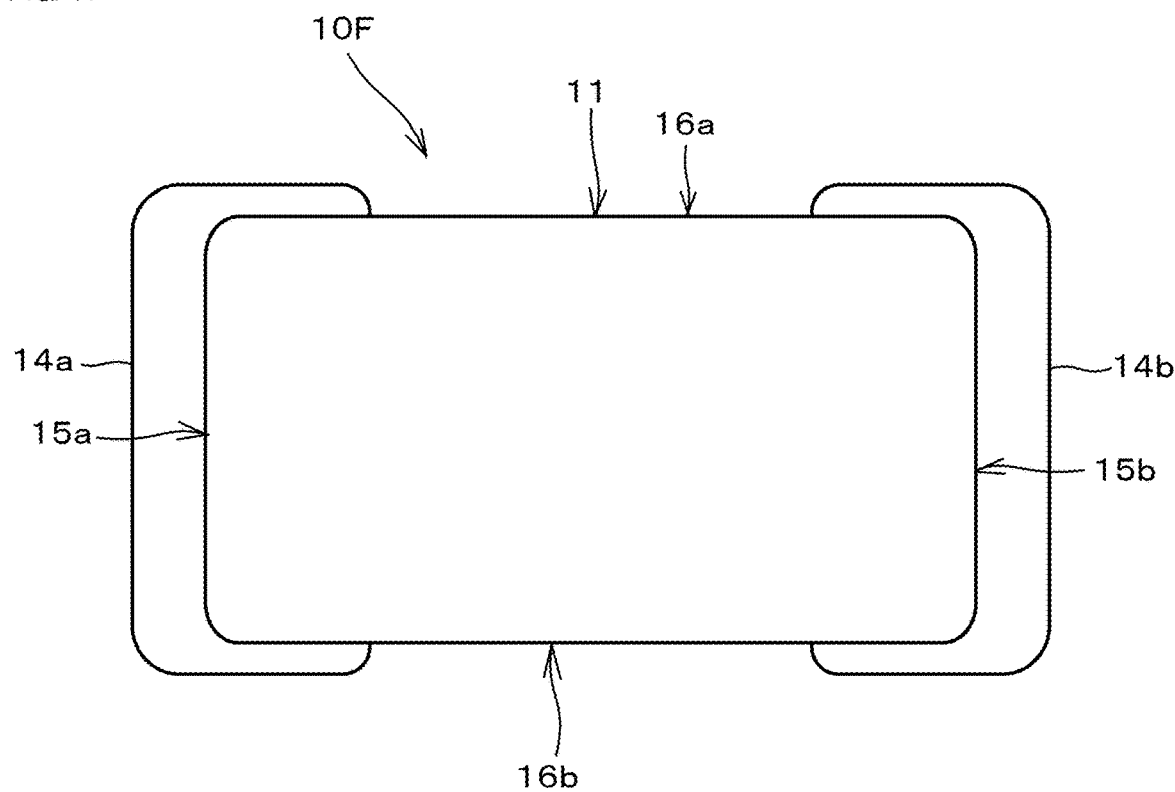
FIG. 11 is a side view of a multilayer ceramic capacitor including a first outer electrode provided over a first end surface of a ceramic body and on a portion of each of a first principal surface and second principal surface of the ceramic body and a second outer electrode provided over a second end surface of the ceramic body and on a portion of each of the first principal surface and second principal surface of the ceramic body.

FIG. 11 is a side view of a multilayer ceramic capacitor 10F including a first outer electrode 14a provided over a first end surface 15a of a ceramic body 11 and on a portion of each of a first principal surface 16a and second principal surface 16b of the ceramic body 11 and a second outer electrode 14b provided over a second end surface 15b of the ceramic body 11 and on a portion of each of the first principal surface 16a and second principal surface 16b of the ceramic body 11. As shown in FIG. 11, in the multilayer ceramic capacitor 10F, the first outer electrode 14a and the second outer electrode 14b are provided on only three surfaces of the ceramic body 11. Therefore, the multilayer ceramic capacitor 10F can be further downsized.

Figure 12:
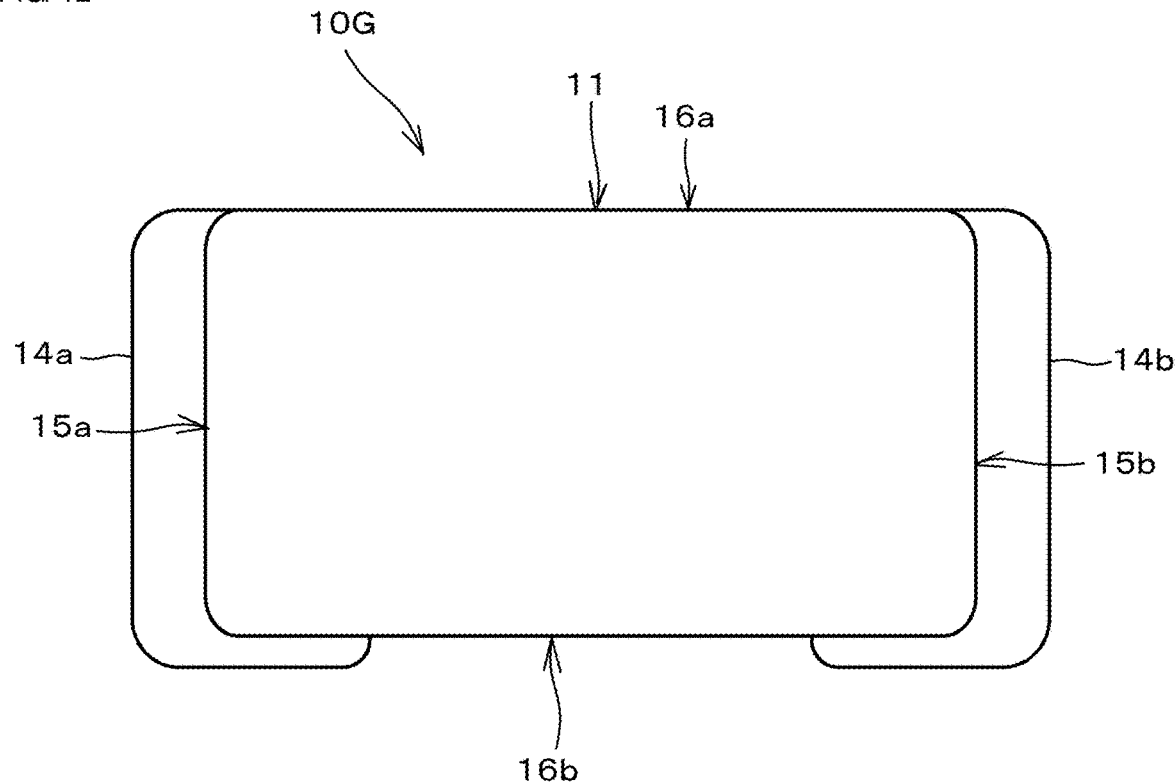
FIG. 12 is a side view of a multilayer ceramic capacitor including a first outer electrode provided over a first end surface of a ceramic body and on a portion of a first principal surface of the ceramic body and a second outer electrode provided over a second end surface of the ceramic body and on a portion of the first principal surface of the ceramic body.

FIG. 12 is a side view of a multilayer ceramic capacitor 10G including a first outer electrode 14a provided over a first end surface 15a of a ceramic body 11 and on a portion of a first principal surface 16a of the ceramic body 11 and a second outer electrode 14b provided over a second end surface 15b of the ceramic body 11 and on a portion of the first principal surface 16a of the ceramic body 11. As shown in FIG. 12, in the multilayer ceramic capacitor 10G, the first outer electrode 14a and the second outer electrode 14b are provided on only two surfaces of the ceramic body 11. Therefore, the multilayer ceramic capacitor 10G can be further downsized.

In the multilayer ceramic capacitor 10F shown in FIG. 11 and the multilayer ceramic capacitor 10G shown in FIG. 12, an underlying electrode layer included in each outer electrode may be provided only on an end surface or may extend to principal surfaces and side surfaces.

In the multilayer ceramic capacitor 10B according to the second preferred embodiment and the multilayer ceramic capacitor 10C according to the modification of the second preferred embodiment, a configuration in which surfaces of the ceramic body 11 are provided with the semiconducting regions 70a and 70b instead of metal-containing layers 142a and 142b is used. A configuration in which the metal-containing layer 142a is provided on the semiconducting region 70a and the metal-containing layer 142b is provided on the semiconducting region 70b may be used. Accordingly, plating layers are able to be readily formed.

In the above-described preferred embodiments and the modifications thereof, each of the metal-containing layers 142a and 142b is provided on a corresponding one of portions of each of the first principal surface 16a, the second principal surface 16b, the first side surface 17a, and the second side surface 17b of the ceramic body 11. However, each of the metal-containing layers 142a and 142b may be provided on a portion of at least one of the first principal surface 16a, the second principal surface 16b, the first side surface 17a, and the second side surface 17b of the ceramic body 11 depending on a region where a plating layer is provided.

Similarly, each of portions of at least one of the first principal surface 16a, the second principal surface 16b, the first side surface 17a, and the second side surface 17b of the ceramic body 11 may be provided with a corresponding one of the semiconducting regions 70a and 70b depending on a region where a plating layer is provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including a first end surface, a second end surface facing the first end surface in a length direction, a first side surface, a second side surface facing the first side surface in a width direction perpendicular or substantially perpendicular to the length direction, a first principal surface, and a second principal surface facing the first principal surface in a thickness direction perpendicular or substantially perpendicular to the length direction and the width direction; and
outer electrodes provided on at least a portion of the first end surface and at least a portion of second end surface of the ceramic body; wherein
each of the outer electrodes includes:
an underlying electrode layer provided on at least a portion of a corresponding one of the first end surface and second end surface of the ceramic body; and
a plating layer provided on a corresponding one of the underlying electrode layers and on a corresponding one of regions different from the underlying electrode layers;
each of the plating layers covers a corresponding one of the underlying electrode layers and a portion of at least one surface among the first principal surface, the second principal surface, the first side surface, and the second side surface of the ceramic body;
portions of at least one surface among the first principal surface, the second principal surface, the first side surface, and the second side surface of the ceramic body are semiconducting regions; and
each of the plating layers covers a corresponding one of the semiconducting regions.

2. The ceramic electronic component according to claim 1, wherein
each of the outer electrodes further includes a metal-containing layer provided on a portion of at least one surface among the first principal surface, the second principal surface, the first side surface, and the second side surface of the ceramic body; and
each of the plating layers is provided on at least a corresponding one of the underlying electrode layers and a corresponding one of the metal-containing layers.

3. A ceramic electronic component comprising:
a ceramic body including a first end surface, a second end surface facing the first end surface in a length direction, a first side surface, a second side surface facing the first side surface in a width direction perpendicular or substantially perpendicular to the length direction, a first principal surface, and a second principal surface facing the first principal surface in a thickness direction perpendicular or substantially perpendicular to the length direction and the width direction; and
outer electrodes provided on at least a portion of the first end surface and at least a portion of second end surface of the ceramic body; wherein
each of the outer electrodes includes:
an underlying electrode layer provided on at least a portion of a corresponding one of the first end surface and second end surface of the ceramic body;

a metal-containing layer provided on a portion of at least one surface among the first principal surface, the second principal surface, the first side surface, and the second side surface of the ceramic body; and a plating layer provided on at least a corresponding one of the underlying electrode layers and a corresponding one of the metal-containing layers, and on a corresponding one of regions different from the underlying electrode layers; and a size of metal particles included in the underlying electrode layers is larger than a size of metal particles included in the metal-containing layers.

4. The ceramic electronic component according to claim 1, wherein each of the underlying electrode layers extends from the corresponding one of the first end surface and the second end surface of the ceramic body to at least one among the first principal surface, the second principal surface, the first side surface, and the second side surface of the ceramic body;

each of the plating layers covers at least a corresponding one of the underlying electrode layers; and a ratio of an extension length of the underlying electrode layers in the length direction to an extension length of the plating layers in the length direction is about 0.5 or less with respect to the first end surface or the second end surface of the ceramic body.

5. The ceramic electronic component according to claim 1, wherein each of the plating layers includes a Ni plating layer, a Sn plating layer provided on the Ni plating layer, and an auxiliary plating layer provided under the Ni plating layer.

6. The ceramic electronic component according to claim 1, wherein the ceramic electronic component is a multilayer ceramic capacitor.

7. The ceramic electronic component according to claim 1, wherein the outer electrodes include a first outer electrode provided on at least a portion of the first end surface of the ceramic body, and a second outer electrode provided on at least a portion of the second end surface of the ceramic body.

8. The ceramic electronic component according to claim 7, wherein the ceramic body includes a plurality of dielectric layers, a plurality of first inner electrodes, and a plurality of second inner electrodes;

the plurality of first inner electrodes are electrically connected to the first outer electrode; and the plurality of second inner electrodes are electrically connected to the second outer electrode.

9. The ceramic electronic component according to claim 8, wherein the first inner electrodes and the second inner electrodes function as and define a capacitor.

10. The ceramic electronic component according to claim 1, wherein each of the underlying electrode layers includes Cu and glass.

11. The ceramic electronic component according to claim 3, wherein the metal-containing layers include at least one selected from the group consisting of Pd, Ti, Cu, Ni, Ni-Cr, and Ni-Cu.

12. The ceramic electronic component according to claim 1, wherein none of the underlying electrode layers is provided on the first principal surface, the second principal surface, the first side surface, or the second side surface of the ceramic body.

13. The ceramic electronic component according to claim 3, wherein each of the underlying electrode layers extends from the corresponding one of the first end surface and the second end surface of the ceramic body to at least one among the first principal surface, the second principal surface, the first side surface, and the second side surface of the ceramic body;

each of the plating layers covers at least a corresponding one of the underlying electrode layers; and a ratio of an extension length of the underlying electrode layers in the length direction to an extension length of the plating layers in the length direction is about 0.5 or less with respect to the first end surface or the second end surface of the ceramic body.

14. The ceramic electronic component according to claim 3, wherein each of the plating layers includes a Ni plating layer, a Sn plating layer provided on the Ni plating layer, and an auxiliary plating layer provided under the Ni plating layer.

15. The ceramic electronic component according to claim 3, wherein the ceramic electronic component is a multilayer ceramic capacitor.

16. The ceramic electronic component according to claim 3, wherein the outer electrodes include a first outer electrode provided on at least a portion of the first end surface of the ceramic body, and a second outer electrode provided on at least a portion of the second end surface of the ceramic body.

17. The ceramic electronic component according to claim 16, wherein the ceramic body includes a plurality of dielectric layers, a plurality of first inner electrodes, and a plurality of second inner electrodes;

the plurality of first inner electrodes are electrically connected to the first outer electrode; and the plurality of second inner electrodes are electrically connected to the second outer electrode.

18. The ceramic electronic component according to claim 17, wherein the first inner electrodes and the second inner electrodes function as and define a capacitor.

19. The ceramic electronic component according to claim 3, wherein each of the underlying electrode layers includes Cu and glass.

20. The ceramic electronic component according to claim 3, wherein none of the underlying electrode layers is provided on the first principal surface, the second principal surface, the first side surface, or the second side surface of the ceramic body.

* * * * *